Aug. 15, 1944.    J. W. BRUNDAGE    2,355,846
VULCANIZER
Filed Dec. 14, 1938    5 Sheets-Sheet 1

INVENTOR.
JAMES W. BRUNDAGE
BY
Bray, Oberlin & Bray
ATTORNEYS.

Aug. 15, 1944.  J. W. BRUNDAGE  2,355,846
VULCANIZER
Filed Dec. 14, 1938  5 Sheets-Sheet 2
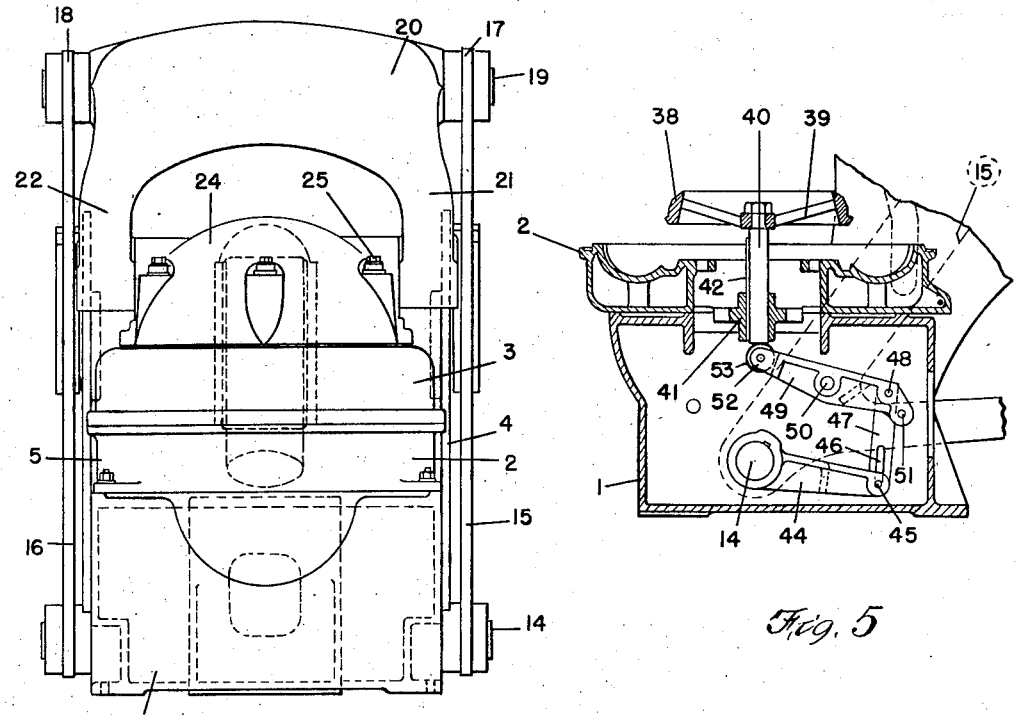
Fig. 3.
Fig. 5.
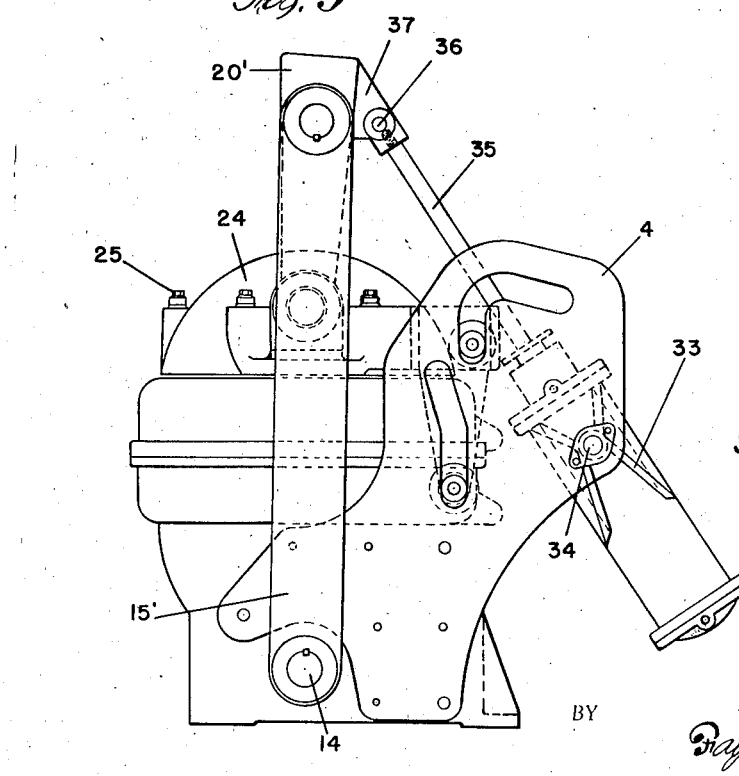
Fig. 4.
INVENTOR.
JAMES W. BRUNDAGE
BY
ATTORNEYS.

Aug. 15, 1944.   J. W. BRUNDAGE   2,355,846
VULCANIZER
Filed Dec. 14, 1938    5 Sheets-Sheet 3
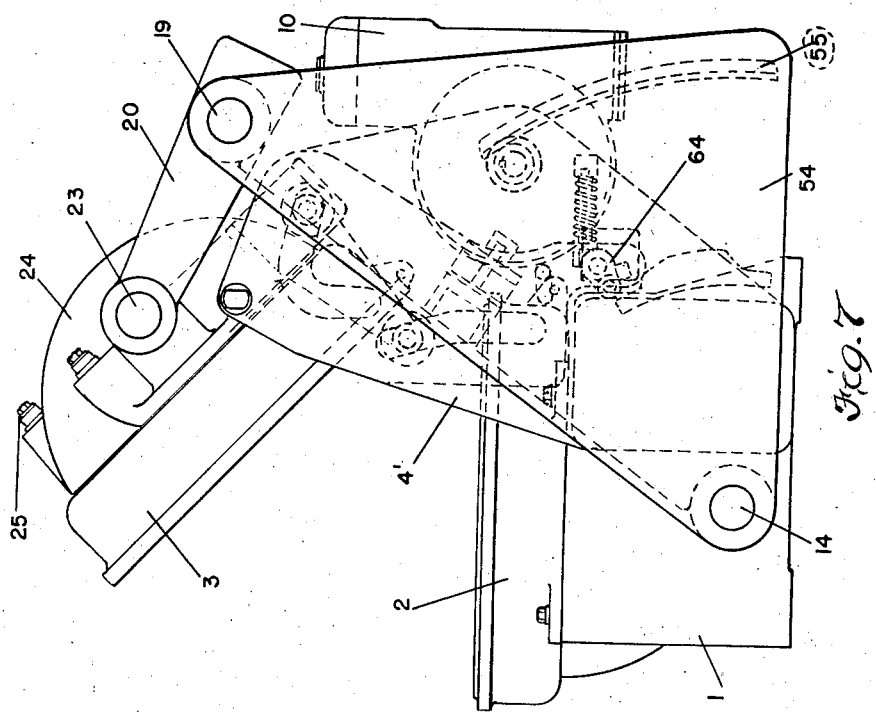
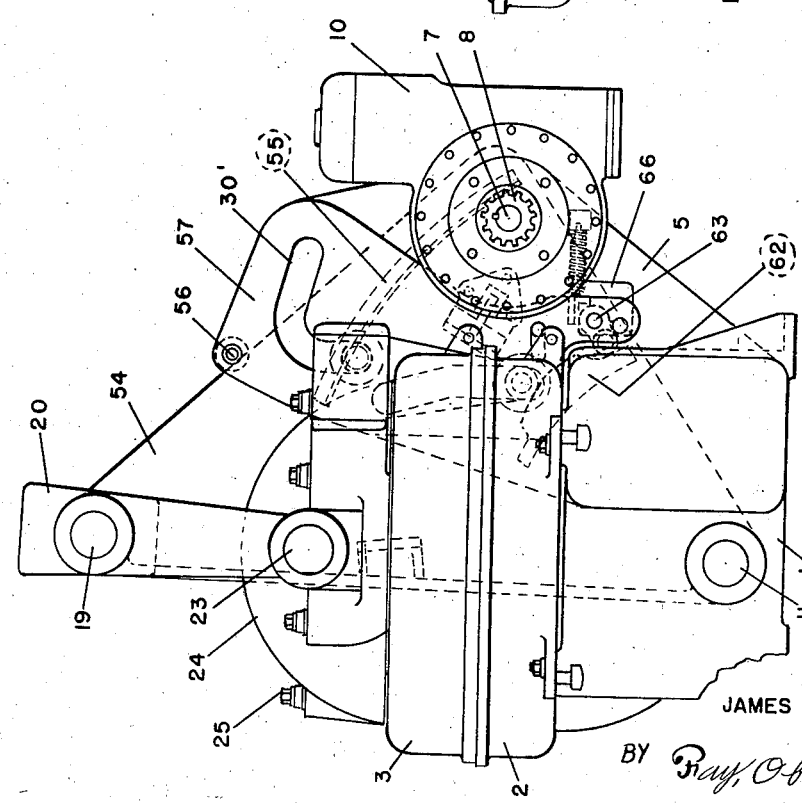
INVENTOR.
JAMES W. BRUNDAGE
BY Ray, Oberlin & Ray
ATTORNEYS

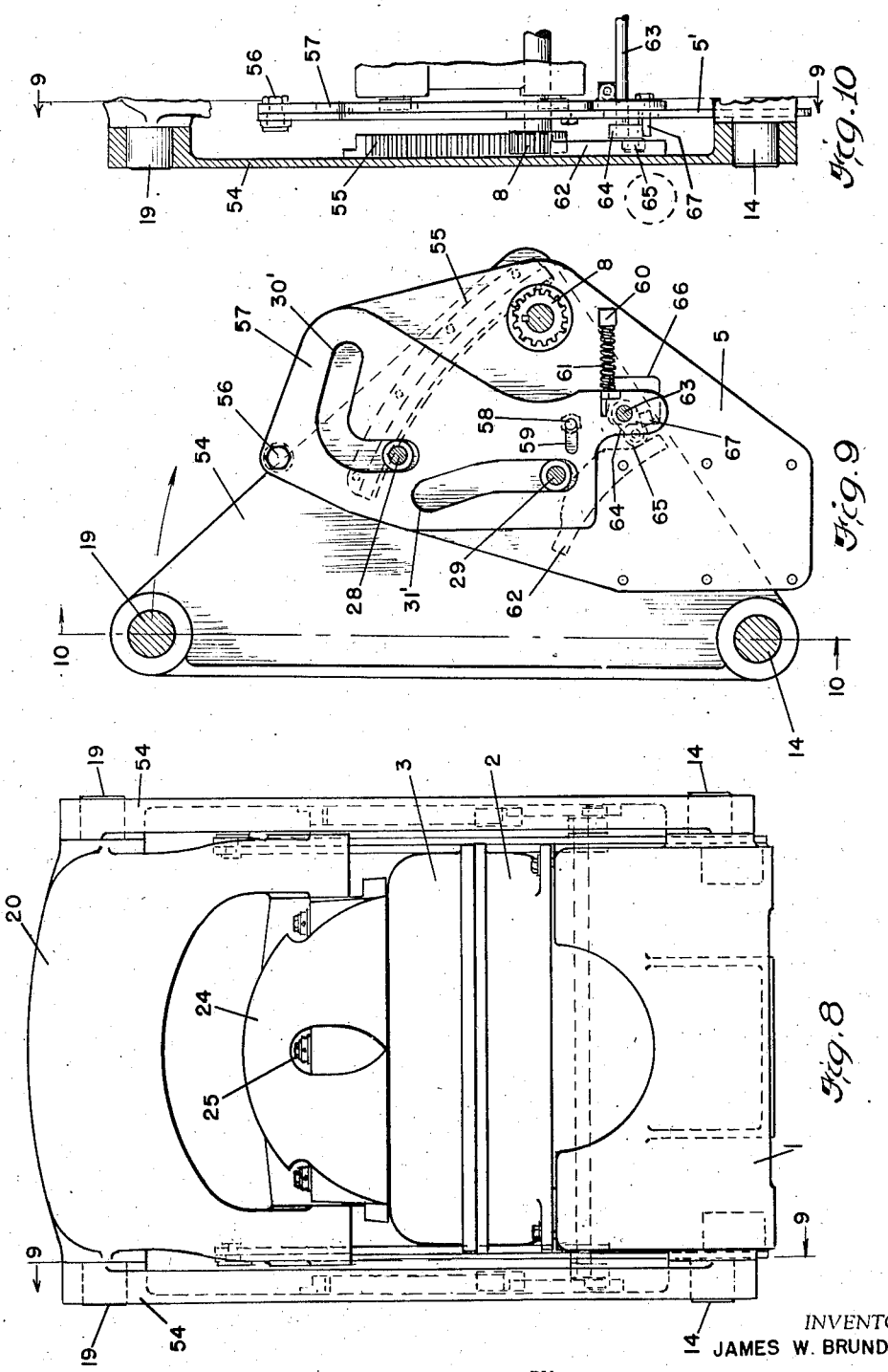

Aug. 15, 1944.  J. W. BRUNDAGE  2,355,846
VULCANIZER
Filed Dec. 14, 1938  5 Sheets-Sheet 5
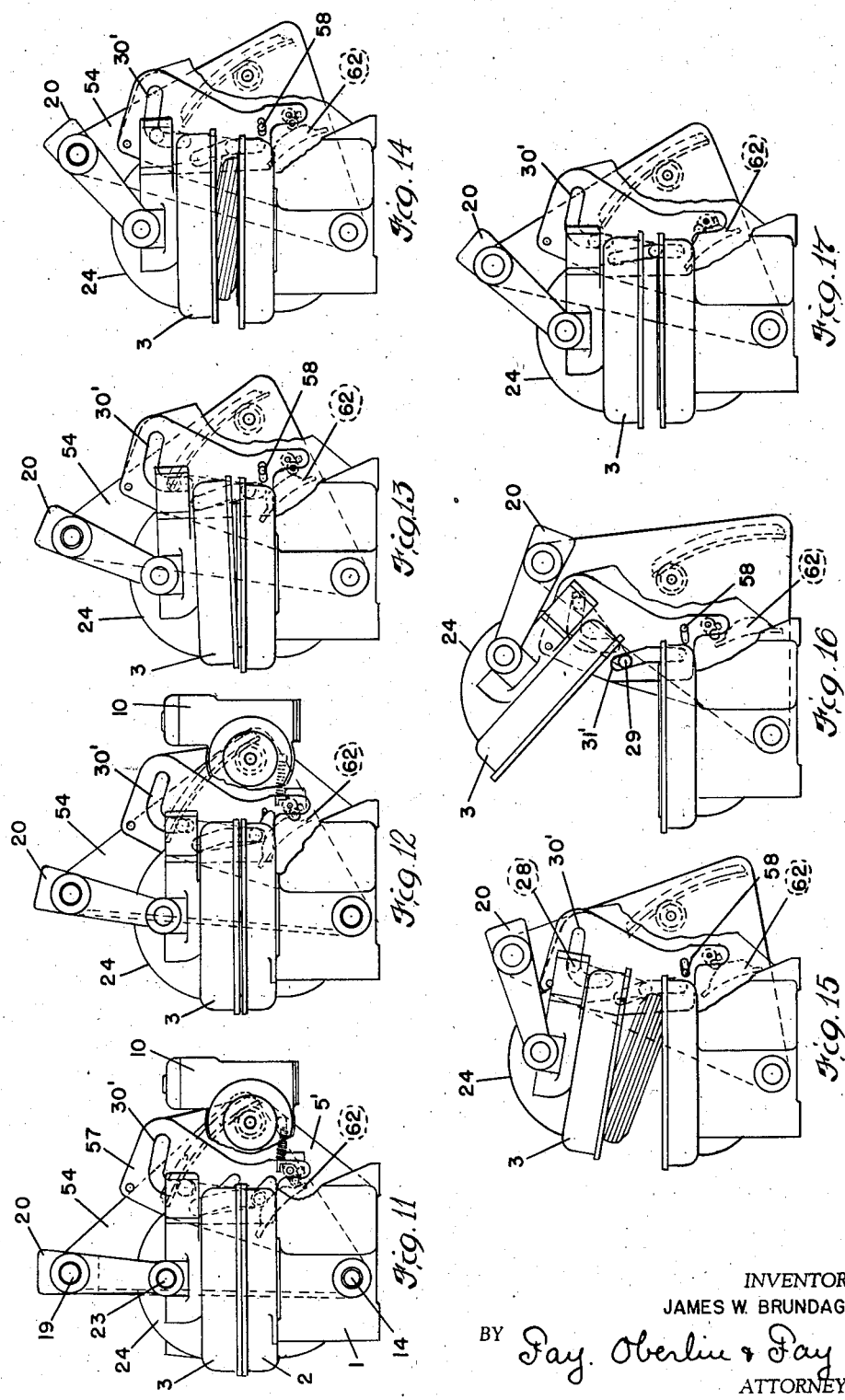
INVENTOR.
JAMES W. BRUNDAGE
BY Fay, Oberlin & Fay
ATTORNEYS Patented Aug. 15, 1944

2,355,846

UNITED STATES PATENT OFFICE 2,355,846

VULCANIZER

James W. Brundage, Akron, Ohio, assignor, by mesne assignments, to The McNeil Machine and Engineering Company, Akron, Ohio, a corporation of Ohio Application December 14, 1938, Serial No. 245,726

5 Claims. (Cl. 18—17)

This invention relates as indicated to vulcanizers, and more particularly to the type of apparatus employed for the purpose of vulcanizing or curing rubber articles and more especially inflatable articles such as tires, tubes, etc.

It is a principal object of my invention to provide an apparatus of the character described characterized by simplicity of construction, and further by the fact that when certain types of articles are being cured the vulcanizer or curing press in opening is effective to automatically eject the cured article from the molds.

Other objects of my invention will appear as the description proceeds.

To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawings:

Fig. 3 is a front elevational view, i. e., taken from the left hand side, of the apparatus illustrated in the previous figures and more particularly as illustrated in Fig. 2, i. e., with the press closed;

Fig. 4 is a side elevational view of an apparatus similar to that illustrated in the previous figures but modified in that hydraulic instead of electrical means is employed for the purpose of actuating the same;

Fig. 5 is a fragmentary sectional view of the apparatus illustrated in the previous figures, illustrating more particularly one form of means which is effective to eject the cured article from one of the mold cavities at the conclusion of the curing operation;

Fig. 6 is a side elevational view with side plate and side arm removed from the near side, of a press generally similar to that illustrated in Figs. 1 and 2 but modified in the particular arrangement of the power means by which the press is actuated, and being further modified by the inclusion of means effective to control in a particular way separating movement of mold sections;

Fig. 7 is a side elevational view of the press illustrated in Fig. 6 showing the same in the open position;

Fig. 8 is an end elevational view, i. e., taken from the left hand side of the press as illustrated in Figs. 6 and 7;

Fig. 9 is a fragmentary sectional view of the press illustrated in Fig. 8, taken on a plane substantially indicated by the line 9—9 in Fig. 8 as well as the line 9—9 in Fig. 10;

Fig. 10 is a transverse sectional view of the structure illustrated in Fig. 9 taken on a plane substantially indicated by the line 10—10; and Figs. 11 to 17 are side elevational views, somewhat diagrammatic, of the press illustrated in Figs. 6 and 7, showing the various stages in the opening and closing movement of the press.

Figure 1:
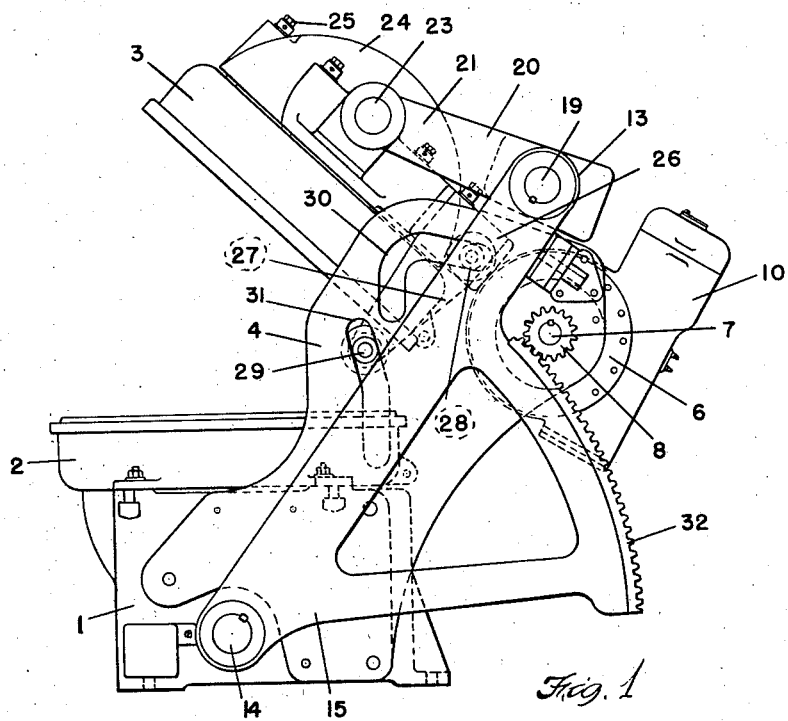
Fig. 1 is a side elevational view of one form of apparatus constructed in accordance with the principles of my invention.
Figure 2:
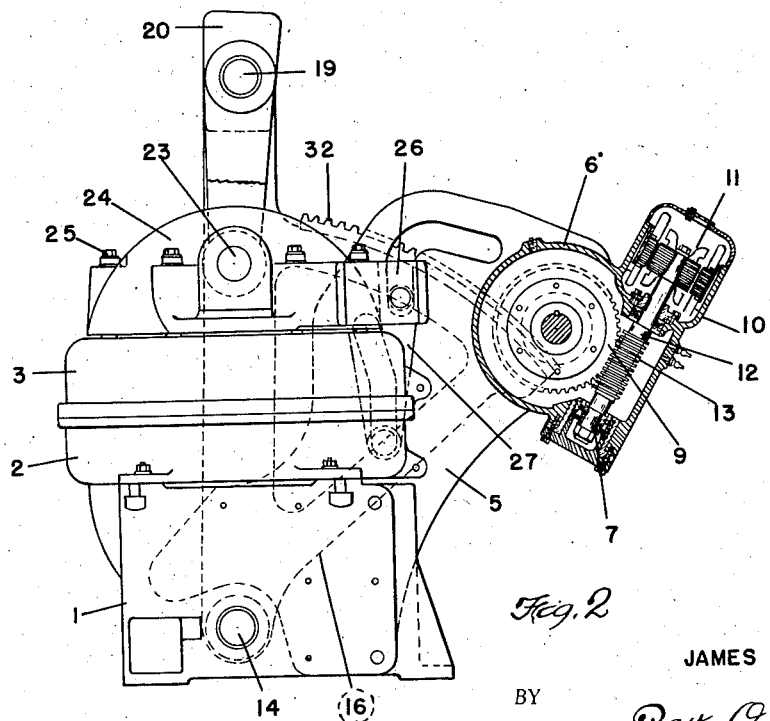
Fig. 2 is a side elevational view, partially in section, of the apparatus illustrated in Fig. 1, showing the press in a closed position with side plate and side arm removed from the near side.

Referring now more specifically to the drawings and more especially to Figs. 1 to 3, the particular embodiment of my invention disclosed in these figures comprises a press including a base generally indicated at 1 which carries a lower stationary mold half 2 which is adapted to mate with an upper movable mold half 3 for the purpose of defining a cavity within which the article to be cured is restrained and heated during the curing operation.

The base 1, which is generally rectangular in form, has secured thereto on opposite sides thereof side plates 4 and 5, these side plates being at their lower ends rigidly secured to the base 1 and at their upper extremities supporting therebetween a housing 6. The housing 6, which is tubular in form, has journalled therein a shaft 7 the opposite ends of which extend from such housing and have pinions 8 keyed thereto. Centrally of the housing 6 the shaft 7 has a worm gear 9 keyed thereto so that upon rotation of the worm gear 9 the shaft 7 and its associated pinions will be rotated.

In a rearwardly extending enlargement 10 of the housing 6 there is mounted an electric motor 11 the shaft 12 of which extends downwardly and is journalled in bearings mounted in the housing and between such bearings the shaft 12 is provided with a worm gear 13 which meshes with the worm gear 9. Energization of the motor 11 in opposite directions will therefore result in driving the pinions 8 in opposite directions.

The base 1 of the press has journaled therein a shaft 14 to the opposite ends of which are keyed side arms 15 and 16. The upper ends 17 and 18 respectively of the side arms 15 and 16 are engaged by a transversely extending head shaft 19. Intermediately of the side arms the head shaft 19 carries a U-shaped head 20 the spaced legs 21 and 22 of which at their lower ends engage stub shafts such as 23 carried by the movable upper head 24 which in turn carries the upper mold half 3. The upper mold half 3 may be secured to its supporting head 24 by means of a plurality of adjusting screws 25 by which the relationship of the mold half 3 with respect to its head 24 may be adjusted. In other words, these adjusting screws 25 may be employed for the purpose of so adjusting the upper mold half 3 that when the press is moved to the closed position such mold half will properly register with the stationary lower mold half 2.

The movable upper head 24 is provided on each side with a rearwardly extending arm 26 and a downwardly extending arm 27. The rearwardly extending arms 26 carry stub shafts on which are mounted rollers 28 and the downwardly extending arms 27 carry stub shafts on which are mounted the rollers 29.

The side plates 4 and 5 are each provided with cam slots 30 and 31 in which the rollers 28 and 29 are respectively positioned.

The side arms 15 and 16 each carry a segmental rack 32, the center of which is the axis of the shaft 14. The racks 32 mesh with the pinions 8 so that as the pinions are rotated the side arms 15 and 16 are moved relatively to the side plates 4 and 5.

With the press in the open position, as illustrated in Fig. 1, it may be closed, i. e., by moving the upper press head 24 and its associated mold half 3, in the following manner. The motor 11 is energized in such a direction so as to drive the shaft 7 and its associated pinions 8 in a clockwise direction, as viewed in Fig. 1. This will result in a rotation of the side arms 15 and 16 in a counterclockwise direction as viewed in Fig. 1. The described movement of the side arms 15 and 16 will result in a movement to the left of the U-shaped head 20 carrying the head 24 to the left and downwardly until the movable upper mold half 3 engages the lower mold half 2. The path of movement of the upper head is such as determined by the rollers 28 and 29 moving in the cam slots 30 and 31 respectively; that is, the upper mold half 3 is first tipped into a plane parallel with the plane of the lower mold half 2 after which the two mold halves are brought together by relative rectilinear movement. The power line to the motor 11 will preferably be provided with an overload relay so that the motor 11 continues to drive the upper mold half into engagement with the lower mold half until the load on the motor exceeds the rated overload value of the relay whereupon the motor is deenergized. By this expedient it is not necessary to employ a closing limit switch, and, furthermore, proper and complete closure of the two mold halves is insured at all times and without relying on the very close setting which would be necessary if such closing limit switch were employed.

It will be observed that the press can be readily disassembled by merely removing the upper mold half 3 and then energizing the motor 11 for closing movement of the press, whereupon the upper head 24 will be permitted to descend for a distance sufficient to permit the pinions 8 to run off the back ends of the racks 32. A reversal of this procedure may be employed when the press is assembled.

The path of movement of the upper mold half 3 when opening the press is a reversal of the closing movement of the press, and is obtained by a reversal of the procedure just outlined.

The modification illustrated in Fig. 4 is the adaptation of hydraulic power means for the purpose of actuating the press to the structure illustrated in the previous figures. Like reference characters will therefore be employed to designate those parts of the press illustrated in Fig. 4 which are the same as the parts of the press illustrated in Figs. 1 and 2.

The press of Fig. 4, instead of employing a tubular housing such as 6 employed in the press of Figs. 1 and 2, has a fluid pressure ram 33 pivotally supported on stub shafts 34 between the side plates 4 and 5. The piston rod 35 of this fluid pressure ram is at its upper end pivotally connected to a pin 36 carried by a rearward extension 37 on the head 20' which otherwise corresponds to the head 20 of the press illustrated in Figs. 1 to 3. The operation of the press illustrated in Fig. 4 is, aside from the employment of fluid power means, identical with the operation of the press illustrated in Figs. 1 to 3, the side arms such as 15' being, of course, simplified over those of the form shown in Figs. 1 and 2, since they are not here employed as a portion of the driving means.

In presses of this character, especially when curing tire casings, it is desirable to provide some means for stripping the cured articles from the lower mold half. The means whereby this is accomplished in each of the presses disclosed in Figs. 1 and 4 is particularly illustrated in Fig. 5. It will be noted that each of the presses respectively illustrated in Figs. 1 and 4 are characterized by the fact that the shaft 14 extends through the base 1 and such shaft rotates incidental to the movement of the side arms 15 and 16 during the opening and closing movements of the press.

The lower mold half 2 is provided with a separable stripping ring 38 so arranged that when in place on the lower mold half it forms a portion of the matrix face on which the tire is supported, and, in particular, engages the bead of the tire. The ring 38 by means of the spider 39 centrally thereof is secured to a rod 40 which is vertically slidable in the bearing 41 carried by the upper wall of the base 1. A key 42, carried by the rod 40 and operating in a complementary slot in the bearing 41 while permitting relative axial movement between the bearing and rod, restrains relative circumferential movement therebetween.

An arm 44 is keyed to the shaft 14 and the end of such arm carries a pin 45 which extends through elongated slot 46 formed in the lower end of the link 47. The link 47 at its upper end is pivotally connected by means of the pin 48 to a rocker arm 49, the fulcrum support of which is the cross shaft 50 supported by the base frame 1. The rocker arm 49 is provided with another opening 51 in which the pin 48 may be inserted. This second opening provides a longer lever arm so that for a corresponding movement of the shaft 14 the throw of the free end 52 of the rocker arm may be varied. This free end 52 of the rocker arms carries a roller 53 which engages the lower end of the shaft 40 so that upon oscillation of the shaft 14 the rod 40 is raised and lowered in order to raise and lower the stripper ring 38.

The form of press details of construction of which are illustrated in Figs. 6 to 10 and the mode of operation of which is illustrated in Figs.

11 to 17 differs from the press illustrated in the previous figures such as, for example, Fig. 1, in the particular means provided for guiding the movable mold head particularly during its opening movement. It will be observed that in the press as illustrated in Figs. 1 and 3, for example, the cam slots by which the movable head is guided are formed in the side plates 4 and 5 of the press. The press illustrated in Figs. 6 and 7 and the operation of which is shown diagrammatically in Figs. 11 to 17 is characterized by the fact that these guiding cam slots are formed in separate plates on opposite sides of the machine and such plates are pivotally attached to the fixed side plates of the machine and these separate plates which carry the cam slots are then, in the manner presently to be described, moved during the operation of the press so that the relationship of the cam slots with respect to the fixed base of the press is altered whereby a modified form of opening movement of the upper press head 24 is effected.

Referring now more specifically to Fig. 9, the part of this assembly which corresponds to the side arms 15 of the structure previously described is the triangular shaped side arm 54. This member 54 is at its lower end mounted on the cross shaft 14 of the press and at its upper end secured to the trunnions 19 of the upper head 20. It will be observed that the same reference characters employed in designating parts of the press originally described will be employed to designate those parts of the press illustrated in Figs. 6 to 10 which are the same. Each of the side members 54 have an internal rack 55 secured to the inner faces thereof, which racks mesh with the pinions 8 attached to the ends of the shaft which is driven by the motor. In other respects the motor, its associated housing and the drive shaft and gearing contained therein, are the same as those employed in the press illustrated in Fig. 1, for example, so that like reference characters will be employed to designate like parts.

The side plates 4' and 5' of the press are rigidly secured to the base thereof and at their upper corners are provided with stub shafts 56 on which are pivotally mounted the auxiliary side plates 57. The auxiliary side plates 57 have cam slots 30' and 31' formed therein and it will be observed that these cam slots are of the same character as those provided in the press illustrated in Fig. 1.

The side plates 4' and 5' are each provided with studs 58 extending therefrom into slots 59 formed in the auxiliary side plates 57. These studs 58 and their cooperating slots 59 are for the purpose of limiting relative pivotal movement between the side plates 4' and 5' and their associated auxiliary side plates such as 57. This is best illustrated in Fig. 9.

Each of the side plates 4' and 5' is provided with an abutment 60 for a spring 61, the opposite end of which bears against an abutment provided on the auxiliary side plates such as 57. These springs such as 61 are under compression and therefore normally urge the auxiliary side plates such as 57 against the limit studs 58 so that the relative position of the cam slots with respect to the fixed side plates and the base of the machine is the same as that of the press illustrated in Fig. 1, for example.

The movable side arms 54 each carry cam members 62. Extending across the machine and journaled in the auxiliary side plates 57 is a shaft 63. Mounted on the shaft 63 adjacent the opposite ends thereof and adjacent the outer faces of the fixed side plates 4' and 5' are arms 64 which carry rollers 65 arranged to be engaged by the cam member 62 as the side arms 54 are moved relatively to the fixed side plates 4' and 5'. The fixed side plates 4' and 5' are provided with enlarged openings 66 adjacent the ends of the shaft 63. An abutment 67 carried by the auxiliary side plate 57 extends through the opening 66 and provides a stop against which the arm 64 rests.

It will be observed that when the pinion 8 is rotated in a clockwise direction, as viewed in Fig. 9, the side arm 54 will be likewise rotated in a clockwise direction, as viewed in Fig. 9. As the cam 62 moves to the right the roller 65 of the arm 64 riding over the load of the cam will cause the arm 64 to press against the abutment 67 and move the auxiliary side plate 57 pivotally in a counterclockwise direction, as viewed in Fig. 9, about the axis of its supporting stub shaft 56. When the cam 62 has progressed in a clockwise direction, as viewed in Fig. 9, for a distance sufficient so that the roller 65 will have passed over the load of the cam and the side arm 54 and its associated cam 62 are then moved in the opposite direction, i. e., counterclockwise as viewed in Fig. 9, the arm 64 will merely be raised so that the cam 62 and the associated cam roller 65 will not be effective to move the auxiliary side plate 57 away from its position resting against the stop 58.

It will be observed that the movement in a clockwise direction, as viewed in Fig. 9, of the side arms 54 results in an opening of the press, i. e., a movement of the upper press head 24 away from the base 1 and a movement of the side arm 54 in the opposite direction, i. e., counterclockwise as viewed in Fig. 9, results in a closing of the press. The cam arrangement just described is therefore effective to change the relation of the cam slots 30' and 31' with respect to the fixed side plates of the machine only during the opening movement of the press and not to disturb such relation during the closing movement of the press.

The movement which is thus imparted to the upper press head during its opening movement is illustrated in Figs. 11 to 16. As the motor is started, driving the pinion 8', the side arms 54 are rotated clockwise as viewed in Figs. 11 to 16. The first increment of such clockwise movement results in an actuation of the U-shaped head 20 to elevate the upper head 24 and its associated upper mold half 3. During this first increment of opening movement the cam roller 65 travels on the lower arcuate portion of the cam 62 so that there is no disturbance of the auxiliary side plates 57 with respect to their associated fixed side plates. Due to the fact therefore that the lower ends of the cam slots 30' and 31' are normal to the plane of the lower mold half 2, the upper mold half 3 will be withdrawn from the lower mold half by relative rectilinear movement. This rectilinear opening movement of the upper head 3 continues for a distance sufficient to separate the mold register, i. e., the overlapping portions of the two mold halves. This relative rectilinear movement continues until there is a separation of such register to the extent of about ¼ inch.

When the opening movement has progressed to the point just described, the cam roller 65 begins to ride upwardly onto the load of the cam 62 causing a shifting in a counterclockwise direction, as viewed in Fig. 9, of the auxiliary side plates with respect to the fixed side plates. This shifting of the side plates coincidental with the further opening movement of the press causes the upper mold half 3 to be inclined to the horizontal with the front edge closer to the lower mold half than the rear edge. This relationship is most clearly illustrated in Fig. 13.

From the position illustrated in Fig. 13 the upper mold half 3 moves away from the lower mold half along a line inclined to the plane of the lower mold half to the extent that the auxiliary side plates have been shifted by the cams. This separating movement continues until the upper roller 28 enters the rearwardly inclined portion of the upper cam slot 30' whereupon the direction of movement of the upper mold half is altered as most clearly illustrated in Fig. 15, i. e., a separating and backward tilting of the upper mold half with respect to the lower mold half takes place. As the separating movement of the heads is continued the cam slots then guide the upper mold head into the final fully opened position illustrated in Fig. 16.

It will be observed that the particular manner in which the upper mold half is withdrawn from the lower mold half results in the forward edge of the upper mold half engaging the article being cured and moving the same away from the forward edge of the lower mold half. At the same time the cured article is forced against the rear edge of the lower mold half and the rear edge of the upper mold half is withdrawn from the article. Further separation of the mold halves in the manner indicated therefore results in an automatic stripping of the cured article such as a tire from the mold halves so that it may be readily removed by hand from the press after the latter is completely opened. This stripping action is further insured when the cured article, such as an automobile tire casing, is provided with a tread design which has a tendency to interlock with the forward edge of the upper mold half and the rear edge of the lower mold half during the opening movement of the press as described.

While the automatic stripping action of the press when manipulated in the manner described is effective to remove the tire from both mold halves when the press is opened without employing any special type of mold, it is nevertheless within the contemplation of my invention to employ, if necessary in a press of the character described herein, molds such as those disclosed in my Patent No. 2,248,060, granted July 8, 1941, which is characterized by the fact that the mold halves, or more particularly the portions thereof comprising the matrix within which the article is cured, are respectively of greater and less extent on opposite sides of a median plane therethrough. Thus when employing the molds of my said patent the molds will be so arranged in the press illustrated in Figs. 11 to 17 that the forward edge of the upper mold half 3 has a greater extent than the corresponding edge of the lower mold half and the rear edge of the lower mold half will have a greater extent than the corresponding edge of the upper mold half.

After the tire or similar cured article has been removed from the press an uncured article is placed in the press in the conventional way and the motor then energized for closing movement, i. e., so that the pinion 8, as viewed in Fig. 9, will rotate in a counterclockwise direction.

As previously explained, the movement of the side arms 54 in a direction to close the press is not effective to shift the auxiliary side plates with respect to the fixed side plates. The upper mold half is therefore during the closing movement first brought into parallelism with the lower mold half, as shown in Fig. 17, and then brought into engagement with the lower mold half by relative rectilinear movement as above explained. The press is thus closed in such a manner that scuffing or pinching of the fragile uncured article is entirely avoided. After the article has been cured the manipulation of the press during the opening movement in the manner described which results in a slight distortion of the cured article will not be detrimental thereto.

While the press of Figs. 6 to 17 has been illustrated and described as actuated by an electric prime mover, it is nevertheless within the contemplation of my invention to actuate the same by other means such as fluid pressure means in the manner illustrated in Fig. 4. All of the controls such as the overload relay effective to deenergize the motor at the end of the closing operation described in connection with the operation of the press illustrated in Fig. 1 may of course be employed in connection with the press of Figs. 6 to 17, so that a further description of the operation of such latter press is believed unnecessary.

If desired, the screw means generally employed at the present time in the operation of mold press vulcanizers may be adapted for use in conjunction with my new press, but the hereinabove described means are usually much to be preferred.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a mold press having a stationary base structure, the combination of an upper and a lower mold section complementary to each other, a shaft rotatably mounted in the base of the press a pair of side arms supporting said upper mold section and attached to said shaft, a separable stripping ring included in said lower mold section, a vertical rod slidably mounted in the base centrally of said ring, said stripping ring secured to said rod, and means joined to said rotatably mounted shaft operative to raise and lower said vertical rod when the shaft is rotated in response to the movement of said side arms.

2. In a mold press having a stationary base structure, the combination of an upper and a lower mold section complementary to each other, a shaft rotatably mounted in the base of the press a pair of side arms supporting said upper mold section and attached to said shaft, a separable stripping ring included in said lower mold section, a vertical rod slidably mounted in the base centrally of said ring, said stripping ring secured to said rod, an arm keyed to said shaft, a rocker arm so positioned that one end contacts the lower end of said vertical rod, and a link connecting the other end of said rocker arm to the end of said arm keyed to said shaft.

3. In a mold press, the combination of an upper and a lower mold section complementary to each other, a pair of pivotally mounted side arms supporting said upper mold section, means for tilting said side arms, a pair of side plates fixedly attached to the base of said press, slotted plates pivotally attached to the inner sides of said side plates, cam followers on said upper mold section fitting in said slots and means for shifting said slotted plates relatively to said side plates during opening movement of the press.

4. In a mold press, the combination of an upper and a lower mold section complementary to each other, a pair of pivotally mounted side arms supporting said upper mold section, means for tilting said side arms, a pair of side plates fixedly attached to the base of said press, slotted plates pivotally attached to the inner sides of said side plates, cam followers on said upper mold section fitting in said slots, resilient means for holding said slotted plates in a fixed position relative to said side plates, and means for shifting said slotted plates relatively to said side plates during opening movement of the press.

5. In a mold press having a stationary base structure, the combination of an upper and a lower mold section complementary to each other, a pair of pivotally mounted side arms supporting said upper mold section, means for tilting said side arms, a pair of side plates fixedly attached to the base of said press, slotted plates pivotally attached to the inner sides of said side plates, cam followers on said upper mold section fitting in said slots, resilient means for holding said slotted plates in a fixed position relative to said side plates, cam followers connected to the lower edges of said slotted plates, openings in said side plates through which said last mentioned cam followers penetrate, cam members attached to the inner sides of said side arms and cooperating with said last mentioned cam followers to tip said slotted side plates when the said side arms are inclined during the opening movement of the press.

JAMES W. BRUNDAGE.